United States Patent

Hara et al.

Patent Number: 5,832,223
Date of Patent: Nov. 3, 1998

[54] SYSTEM, METHOD AND DEVICE FOR AUTOMATIC CAPTURE OF INTERNET ACCESS INFORMATION IN A BROADCAST SIGNAL FOR USE BY AN INTERNET ACCESS DEVICE

[75] Inventors: Jacques Hara, Glen Ellyn; Arnold Pittler, Palatine, both of Ill.; Arun Chatterjee, Austin; Michael Cruess, Round Rock, both of Tex.

[73] Assignee: Motorola, Inc., Schaumburg, Ill.

[21] Appl. No.: 712,403

[22] Filed: Sep. 13, 1996

[51] Int. Cl.⁶ .................................................. H04L 12/28
[52] U.S. Cl. ...................................... 395/200.47; 348/449
[58] Field of Search ............................... 348/449; 380/49, 380/10; 395/200.47, 200.57, 200.59

[56] References Cited

PUBLICATIONS

Bell Labaoratories unveils sophisticated information insertion technology for broadcast and cable advertising. Dec. 9, 1996, Business Wire, "The PointCast Network". pp. 1–2.

Primary Examiner—Thomas Peeso
Attorney, Agent, or Firm—Darleen J. Stockley

[57] ABSTRACT

The present invention provides a system (100, 200), device (300) and method (400) for facilitating automatic capture of internet access information in a broadcast signal for use by an internet access unit. The system includes: a broadcasting unit having an internet access information unit, IAIU, coupled to receive internet access information, for encoding the internet access information into a broadcast signal to provide an augmented signal and broadcasting said augmented signal; a receiving unit for receiving the augmented signal for a user; a capture unit, coupled to the receiving unit and interfaced with the internet, for automatically storing/utilizing the internet access information in accordance with a predetermined scheme; a display/television screen/audio unit, coupled to the capture unit and, where selected, to the capture unit, for displaying at least one of: information obtained by utilizing the internet access information and information from the broadcast signal.

17 Claims, 2 Drawing Sheets

SYSTEM, METHOD AND DEVICE FOR AUTOMATIC CAPTURE OF INTERNET ACCESS INFORMATION IN A BROADCAST SIGNAL FOR USE BY AN INTERNET ACCESS DEVICE

FIELD OF THE INVENTION

The present invention relates to internet access information in broadcast signals, and more particularly, to automatic capture of internet access information in broadcast signals.

BACKGROUND OF THE INVENTION

The World Wide Web (WWW) is a client-server based internet server that allows users all over the world to easily access and display documents that are stored anywhere on the internet. WWW documents are ASCII (American (National) Standard Code for Information Interchange) documents that contain commands from a language called HTML (hypertext markup language). The commands of HTML allow sections of text to be identified or tagged, thus permitting each WWW client to utilize text formatting and to link, i.e., load, a WWW document onto a WWW client even if the related documents of the client are on computers elsewhere in the world.

To access the WWW, a WWW browser, an application that interprets and displays documents found on the WWW, is used. Browsers vary in their capabilities. Some browsers are text-based and other browsers include the ability to access documents that contain other media besides text, e.g., sound clips, still pictures, animations, etc. Some browsers also may be set up to, when the WWW document is obtained that contains a document of a particular type, automatically start the program that allows the WWW document to be displayed when it is retrieved.

Many television and radio commercials today provide URLs (Universal Record Locators), i.e., addresses for WWW documents, on a visual display or via audio. Thus, the viewer/listener is required to write down or remember a URL and then to type the URL as input into a computer with a WWW browser. Such a process is cumbersome and error-prone.

Close-captioning of television programs provide URLs in an information stream with a television signal. However, close-captioning does not trigger any other action. Similarly, URLs are often displayed or read aloud on television, but are not used to trigger other automatic action. National weather radio stations (NOAA) use a tone signal that may activate radio receivers, but the signal is audible on the normal program and does not convey information beyond a simple warning.

Thus, there is a need for a system, method and device for automatic capture of internet access information in a broadcast signal for use by an internet access device.

BRIEF DESCRIPTIONS OF THE DRAWINGS

DETAILED DESCRIPTION OF A PREFERRED EMBODIMENT

The present invention provides for automatic capture of internet access information in a broadcast signal for use by an internet access unit, thus allowing immediate internet information access, or, where desired, storing the internet access information for access in accordance with a predetermined scheme. For example, if one were watching a television show, the internet information access could allow: 1) immediate retrieval of video and/or audio display; 2) retrieval and display immediately following the television show or a visual cue on the show; 3) retrieval and display at any predetermined time; and 4) retrieval and display on demand.

Further, the retrieval and display system may be preprogrammed to store the internet access information automatically in accordance with a cataloging scheme. For example, the internet access information may be stored alphabetically or by the date of receipt. This allows retrieval of the information at a later date without having to rely upon remembering or writing down and filing the internet access information.

Figure 1:
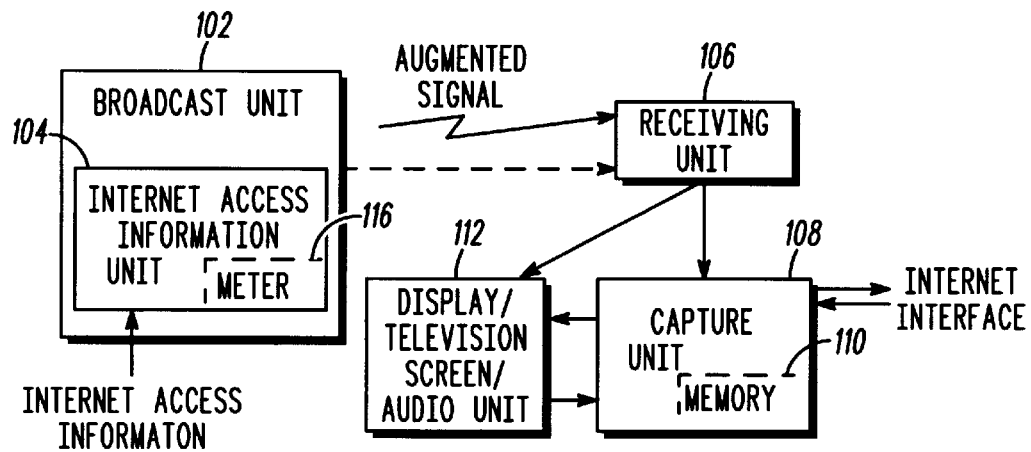
FIG. 1 is a block diagram of one embodiment of a system for providing automatic capture of internet access information in a broadcast signal for use by an internet access unit in accordance with the present invention.

Clearly, the present invention provides for more efficient, convenient retrieval of internet information by setting up an automatic retrieval and, where desired, storage system. FIG. 1, numeral 100, is a block diagram of one embodiment of a system for providing automatic capture of internet access information in a broadcast signal for use by an internet access unit in accordance with the present invention. The system includes a broadcasting unit (102) having an Internet Access Information Unit (IAIU)(104), a receiving unit (106), a capture unit (108), and a display/television screen/audio unit (112). The IAIU (104) may be selected to include a meter (116) that is used for detecting the broadcastable information for billing or accounting purposes. Where selected, the capture unit (108) may also include a memory (110). The broadcasting unit (102) has an IAIU (104) which is coupled to receive internet access information. The IAIU (104) encodes the internet access information into a broadcast signal to provide an augmented signal and broadcasts the augmented signal. The receiving unit (106) receives the augmented signal for a user and sends at least the encoded internet access information to the capture unit (108). The capture unit (108) is coupled to the receiving unit and to an internet interface, for example, a modem or cable modem, and is used for automatically storing/utilizing the internet access information in accordance with a predetermined scheme. The display unit or television screen/audio unit (112) is coupled to the capture unit (108) and, where selected, to the receiving unit, for displaying at least one of: video/audio/textual information obtained by utilizing the internet access information; and information from the broadcast signal. Thus, the display unit or television screen/audio unit may be selected to operate independently from the capture unit, i.e., without the internet access process being activated, or alternatively, with the internet access process being activated.

The augmented signal may be broadcast using wireline/fiber optics/cable communication, transmission through a medium (e.g., air) or a combination of both. The predetermined scheme typically includes one of: A) storing the internet access information in memory until a predetermined time for retrieval and utilization; B) utilizing the internet access information immediately to retrieve information on the internet; and C) utilizing the internet access information on demand, i.e., manually, to retrieve information on the internet.

Thus, a device for automatic capture of internet access information in a broadcast signal typically includes: A) a receiving unit (106), for receiving a broadcast signal having internet access information; B) a capture unit (108), coupled to the receiving unit and an internet interface, for automatically capturing the internet access information to provide initiation of internet access in accordance with a predetermined scheme; and C) a display/television screen/audio unit (112), coupled to the capture unit and where selected, to the receiving unit, for displaying at least one of: the broadcast signal information and information obtained by internet access. Typically, the internet access information may be encoded into a uniform resource locator, URL. The capture unit (108) may be selected to include a memory (110). The predetermined scheme includes at least one of: A) automatically storing the internet access information for subsequent automatic access at a predetermined time; B) automatically storing the internet access information for subsequent manual access at a predetermined time; and C) automatically initiating the internet access utilizing the internet access information. For example, the broadcast signal which is augmented may be a television signal or a radio signal.

Figure 2:
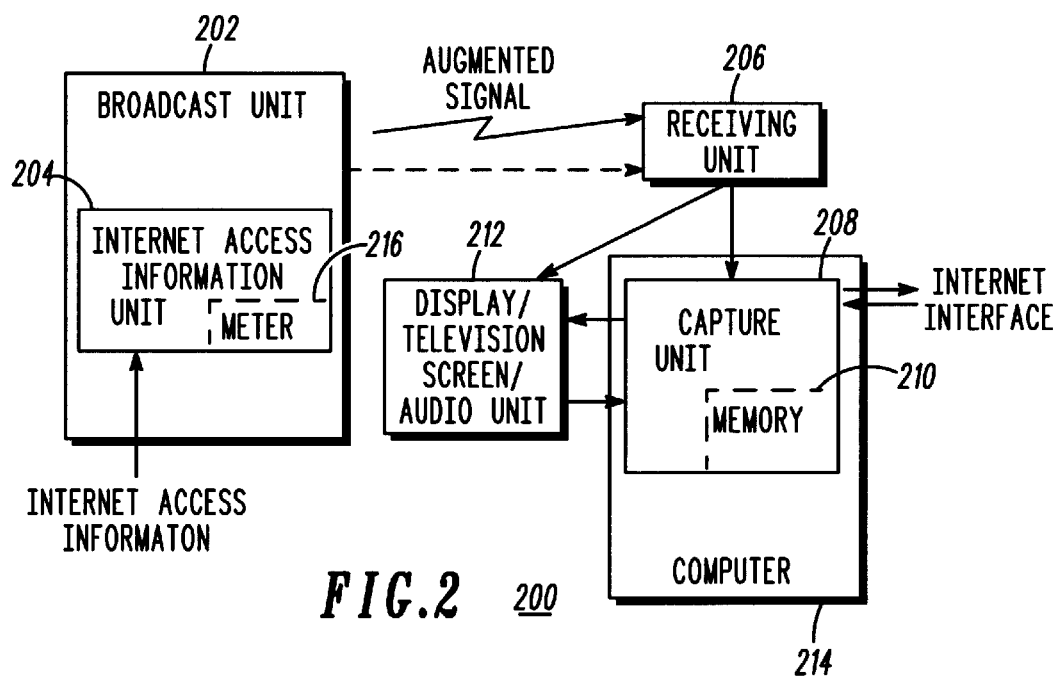
FIG. 2 is a block diagram of another embodiment of a system for providing automatic capture of internet access information in a broadcast signal for use by an internet access unit in accordance with the present invention.

FIG. 2, numeral 200, is a block diagram of another embodiment of a system for providing automatic capture of internet access information in a broadcast signal for use by an internet access unit in accordance with the present invention. This system includes a broadcasting unit (202) having an internet access information unit (IAIU)(204), a receiving unit (206), a capture unit (208) (which, where selected, may have a memory (210)), and a display/television screen/audio unit (212), wherein the elements are coupled in the same fashion as the elements in FIG. 1. The IAIU (204) may be selected to include a meter (216) that is used for detecting the broadcastable information for billing or accounting purposes. In this embodiment, however, the capture unit (208), and where selected, the memory of the capture unit, are included within a computer (214). Clearly, the display unit in FIGS. 1–2 may be the display screen for a computer or a separate display device such as a television screen, speakers, etc.

Figure 3:
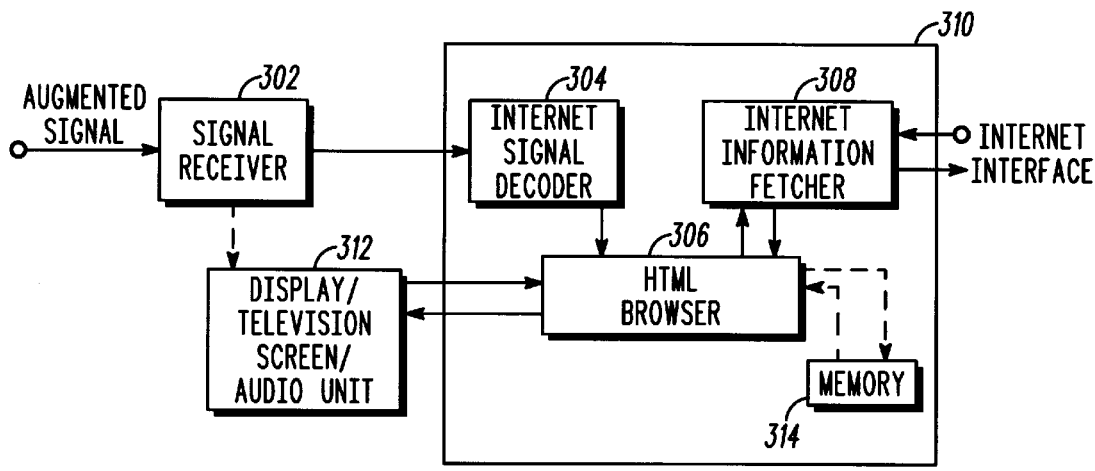
FIG. 3 is a block diagram of one embodiment of a device for providing automatic capture of internet access information in a broadcast signal for use by an internet access unit in accordance with the present invention.

FIG. 3, numeral 300, is a block diagram of one embodiment of a device for providing automatic capture of internet access information in a broadcast signal for use by an internet access unit in accordance with the present invention. The device includes a signal receiver (302), a capture unit (310), an HTML browser, and a display/television screen/audio unit (312). The capture unit (310) typically includes an internet signal decoder (304), coupled to the signal receiver (302), an HTML browser (306), coupled to the internet signal decoder (304) and to the internet information fetcher (308), for initiating fetching by the internet information fetcher (308) and interpreting and sending display information for the internet information obtained to the display/television screen/audio unit (312). Typically, an augmented signal, i.e., a broadcast signal containing internet access information such as a URL, is received at the signal receiver (302) and transmitted to the internet signal decoder (304), which sends the internet access information to the HTML browser (306). The HTML browser (306) signals the internet information fetcher (308) to access the information through the internet interface (typically a modem/cable modem). Upon obtaining the information, the internet information fetcher (308) passes the information to the HTML browser (306), which passes the information to the display/television screen/audio unit (312). Where selected, the HTML browser may utilize a memory (314) to store the internet access information for automated/manual retrieval at a later time, and where selected, may also catalog the internet access information in accordance with a predetermined scheme. For example, the internet access information may be stored alphabetically or by date acquired.

Figure 4:
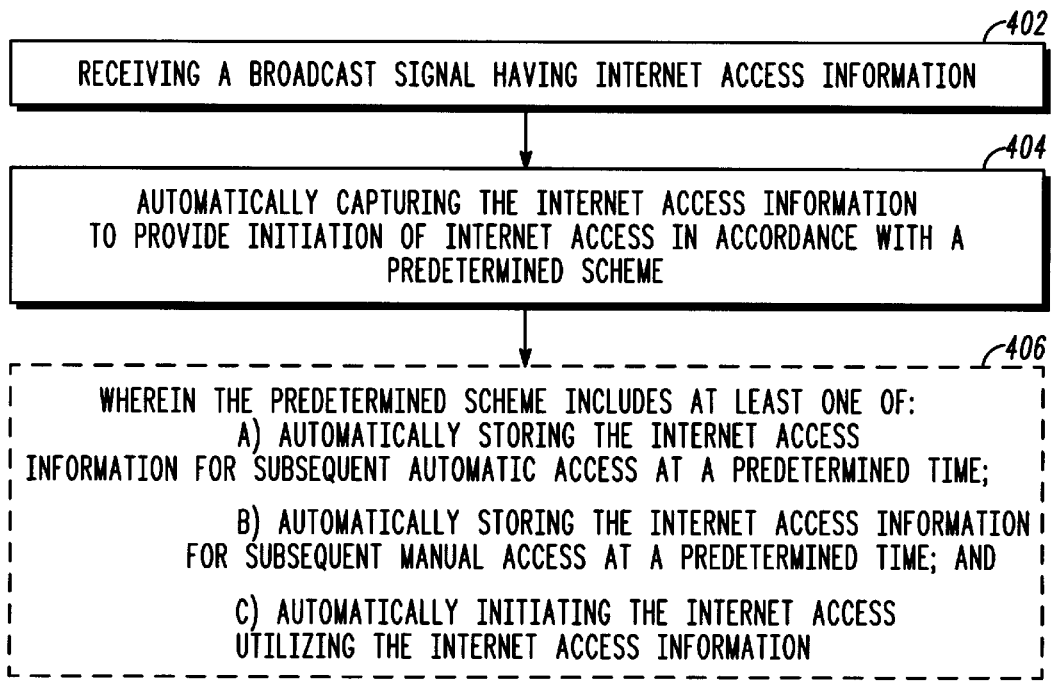
FIG. 4 is a flow chart of one embodiment of steps of a method for providing automatic capture of internet access information in a broadcast signal for use by an internet access unit in accordance with the present invention.

FIG. 4, numeral 400, is a flow chart of one embodiment of steps of a method for providing automatic capture of internet access information in a broadcast signal for use by an internet access unit in accordance with the present invention. The method includes the steps of: A) receiving (402) a broadcast signal having internet access information; and B) automatically capturing (404) the internet access information to provide initiation of internet access in accordance with a predetermined scheme. In one implementation, the internet access information received includes at least one encoded URL. The predetermined scheme typically includes (406) at least one of: A) automatically storing the internet access information for subsequent automatic access at a predetermined time; B) automatically storing the internet access information for subsequent manual access at a predetermined time; and C) automatically initiating the internet access utilizing the internet access information. The broadcast signal is generally a television signal or a radio signal.

A display, as used herein, includes Liquid Crystal Displays of all sizes, and other units or devices for providing information in a visual or audio format.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A system for facilitating automatic storage of internet access information in a broadcast signal for automatic use by an internet access unit comprising:
    A) a broadcasting unit having an internet access information unit, IAIU, coupled to receive internet access information, for encoding the internet access information into a broadcast signal to provide an augmented signal and broadcasting said augmented signal;
    B) a receiving unit for receiving the augmented signal for a user;
    C) a capture unit, coupled to the receiving unit and interfaced with the internet, for automatically storing/utilizing the internet access information in accordance with a predetermined scheme at a predetermined time upon initiation of the predetermined scheme,
    D) a display/television screen/audio unit, coupled to the capture unit and, where selected, to the receiving unit, for displaying at least one of:
        video/audio/textual information obtained by utilizing the internet access information; and
        video/audio/textual information from the broadcast signal.

2. The system of claim 1 wherein said broadcasting unit broadcasts the augmented signal utilizing one of:

A) wireline/fiber optics/cable communication;

B) transmission through a medium; and

C) a combination of A) and B).

3. The system of claim 1 wherein the predetermined scheme includes one of:

A) storing the internet access information in memory until a predetermined time for retrieval and utilization;

B) utilizing the internet access information immediately to retrieve information on the internet; and C) utilizing the internet access information on demand to retrieve information on the internet.

4. The system of claim 1 wherein the IAIU further includes a meter that is used for detecting broadcastable information for billing/accounting purposes.

5. A method for automatic storing of internet access information in a broadcast signal for automatic use by an internet access device, comprising the steps of:

A) receiving a broadcast signal having internet access information; and

B) automatically storing the internet access information to provide initiation of internet access in accordance with a predetermined scheme at a predetermined time upon initiation of the predetermined scheme.

6. The method of claim 5 wherein the internet access information received comprises at least one encoded universal resource locator, URL.

7. The method of claim 5 wherein the predetermined scheme includes at least one of:

A) automatically storing the internet access information for subsequent automatic access at a predetermined time;

B) automatically storing the internet access information for subsequent manual access at a predetermined time; and C) automatically initiating the internet access utilizing the internet access information.

8. The method of claim 5 wherein the broadcast signal is one of:

A) a television signal; and

B) a radio signal.

9. A device for automatic storage of internet access information in a broadcast signal, comprising:

A) a receiving unit, for receiving a broadcast signal having internet access information;

B) a capture unit, coupled to the receiving unit and an internet interface, and, where selected, to a display/television screen/audio unit, for automatically storing the internet access information to provide initiation of internet access in accordance with a predetermined scheme; and C) a display/television screen/audio unit, coupled to the capture unit and where selected, to the receiving unit, for displaying at least one of: the broadcast signal information and, upon initiation of the predetermined scheme, video/audio/textual information obtained by internet access.

10. The device of claim 9 wherein the internet access information is encoded into a uniform resource locator, URL.

11. The device of claim 9 wherein the capture unit further includes a memory, for operation of the predetermined scheme wherein the predetermined scheme includes at least one of: A) automatically storing the internet access information for subsequent automatic access at a predetermined time; B) automatically storing the internet access information for subsequent manual access at a predetermined time; and C) automatically initiating the internet access utilizing the internet access information.

12. The device of claim 9 wherein the broadcast signal is one of:

A) a television signal; and

B) a radio signal.

13. A device for providing automatic storage of internet access information in a broadcast signal for use by an internet access unit comprising:

A) a signal receiver, arranged to receive the broadcast signal;

B) a capture unit, coupled to the signal receiver and an internet interface, and where selected, to a display/television screen/audio unit, for automatically storing the internet access information to provide initiation of internet access in accordance with a predetermined scheme upon initiation of the predetermined scheme, comprising:

B1) an internet signal decoder, coupled to the signal receiver, for decoding the internet access information;

B2) a hypertext markup language browser, coupled to the internet signal decoder, an internet information fetcher, and where selected, to a display/television screen/audio unit, for signaling the internet information fetcher to access information indicated by the internet access information utilizing the internet interface; and B3) the internet information fetcher, coupled to the hypertext markup language browser and an internet interface, for, upon being signaled by the hypertext markup language browser, fetching information using the internet access information; and C) the display/television screen/audio unit, coupled to the hypertext markup language browser of the capture unit and where selected, to the signal receiver, for displaying at least one of: broadcast signal information and information obtained by internet access at a predetermined time upon initiation of the predetermined scheme.

14. A method for automatic storage of internet access information in a broadcast signal for use by an internet access device, comprising the steps of:

A) receiving a broadcast signal having internet access information;

B) automatically storing the internet access information to provide initiation of internet access in accordance with a predetermined scheme at a predetermined time upon initiation of the predetermined scheme;

wherein broadcastable billing/accounting information is captured at a source.

15. The method of claim 14 wherein the internet access information received comprises at least one encoded universal resource locator, URL.

16. The method of claim 14 wherein the predetermined scheme includes at least one of:

A) automatically storing the internet access information for subsequent automatic access at a predetermined time;

B) automatically storing the internet access information for subsequent manual access at a predetermined time; and C) automatically initiating the internet access utilizing the internet access information.

17. The method of claim 14 wherein the broadcast signal is one of:

A) a television signal; and

B) a radio signal.

* * * * *